United States Patent

Muller

[15] 3,645,351

[45] Feb. 29, 1972

[54] DUAL-ENGINE VEHICLE AND METHOD OF OPERATING THE SAME

[72] Inventor: Helmut Muller, Heidenheim, Germany

[73] Assignee: Voith Getriebe KG, Heidenheim, Germany

[22] Filed: July 29, 1970

[21] Appl. No.: 59,211

[30] Foreign Application Priority Data

Aug. 13, 1969 Germany....................P 19 41 152.0

[52] U.S. Cl. ...................................180/54 C, 60/54, 60/102, 74/661, 74/665 T, 74/718
[51] Int. Cl............................................................B60k 5/08
[58] Field of Search....................180/54 C, 54 F, 77 R, 54 R; 74/661, 718, 730, 665 T, 665 S, 665 F, DIG. 3; 60/102, 57; 105/96.2, 62 R

[56] References Cited

UNITED STATES PATENTS

| | | |
|---|---|---|
| 1,019,283 | 3/1912 | Surcouf....................................74/661 |
| 1,447,488 | 3/1923 | Schneider..........................105/96.2 X |
| 2,265,078 | 12/1941 | Marsh....................................180/54 F |
| 2,929,267 | 3/1960 | Wilson....................................60/54 X |
| 2,987,941 | 6/1961 | Qualman et al......................74/DIG. 3 |
| 3,120,763 | 2/1964 | Shuster.............................180/77 R X |
| 3,456,751 | 7/1969 | Sampietro..............................180/54 F |

Primary Examiner—Benjamin Hersh
Assistant Examiner—Milton L. Smith
Attorney—Edwin E. Griegg

[57] ABSTRACT

In a tank having a pair of supercharged engines for driving the transmission via a hydraulic torque converter having a controllable bypass coupling, vibration control and efficiency are improved by providing for the engines individual fluid couplings with a common output to a controllable converter for adaption to the power level. Controllable guide vanes of the converter serve to block the hydraulic coupling when the bypass coupling is operative.

7 Claims, 3 Drawing Figures

PATENTED FEB 29 1972 3,645,351
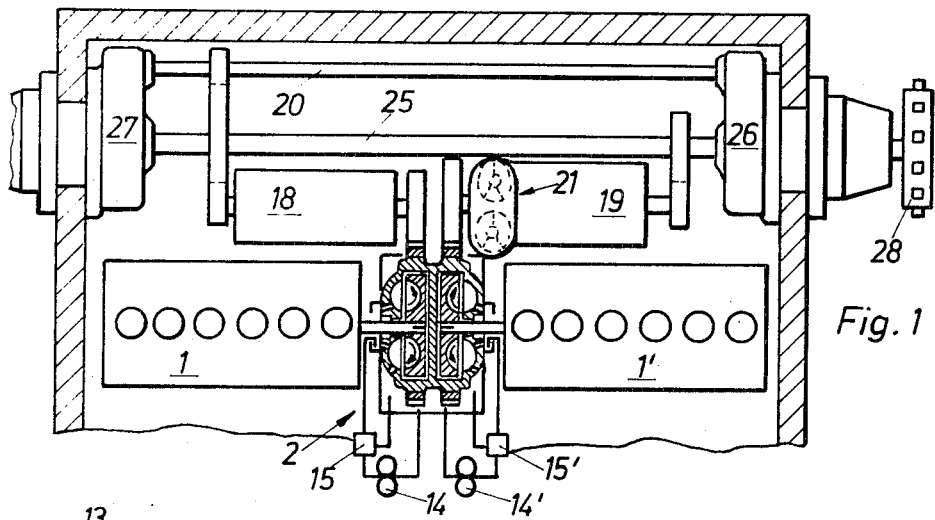
Fig. 1
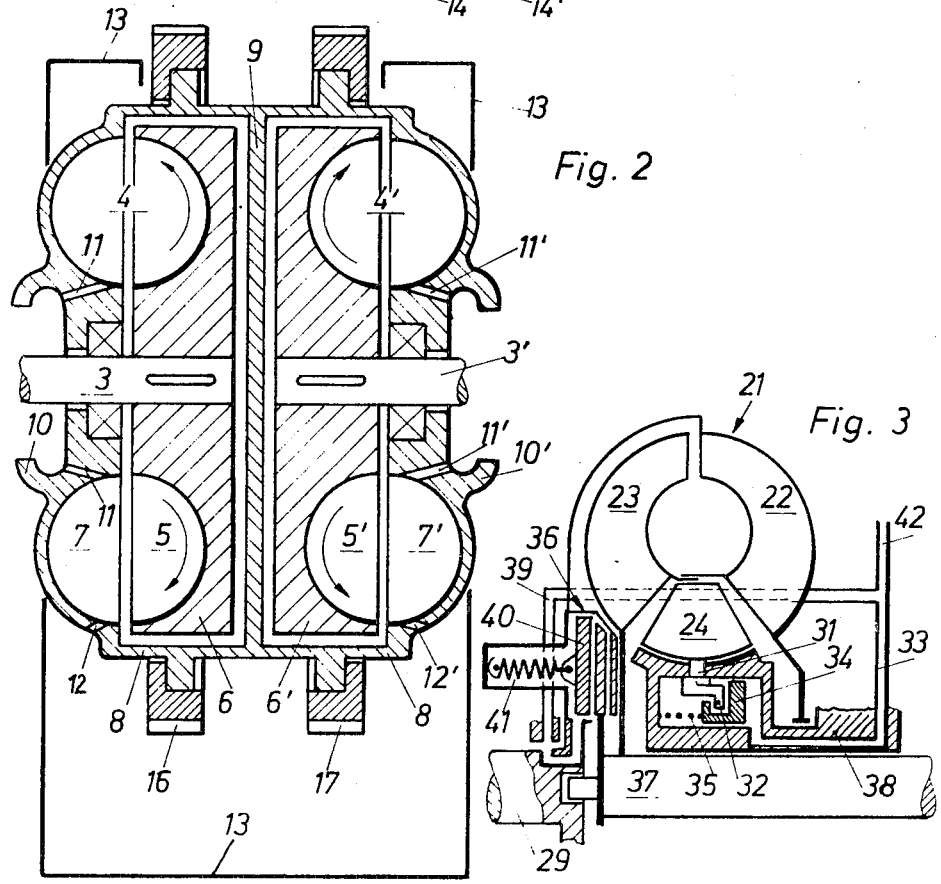
Fig. 2
Fig. 3
INVENTOR.
Helmut Müller
BY
Edwin E. Greigg

DUAL-ENGINE VEHICLE AND METHOD OF OPERATING THE SAME

FIELD OF THE INVENTION

The invention relates to a vehicle, especially a track-laying vehicle, having a pair of internal combustion engines disposed coaxially, preferably perpendicular to the path of the vehicle, and operating singly or in unison via a common speed-changing and/or reversing transmission on the drive wheels, a hydrodynamic converter being inserted between the engines and the drive wheels.

BACKGROUND OF THE INVENTION

A dual-engine driving arrangement of the type referred to has several advantages. Dividing the maximum power between two engines, for one thing, substantially reduces the required space and the weight of the power plant, since it becomes possible to utilize engines of higher r.p.m., which are smaller and have slower weight per horsepower. Also, this division of the power facilitates the use of engine sizes already being produced in large numbers for use in motor vehicles and being therefore less expensive, simpler to service and more favorable in view of storage and spare parts problems. Furthermore, the division of power increases the dependability of operation, since, if one engine fails, there is still one-half of the driving power available.

In dual-engine power plants of the type referred to there are problems of dependable transfer of the driving power from one or both engines to the drive wheels. One such problem is caused by torsional vibrations, which must be kept under control in all operating conditions. CONDITIONS. Also, the engines should be able to run fully independently of each other.

SUMMARY OF THE INVENTION

The above-mentioned problems are solved according to the invention by providing in a vehicle of the type referred to a hydrodynamic dual coupling having a pair of impellers coupled individually to the shafts of the engines and a common secondary wheel composed of a pair of turbine wheels cooperating individually with separate ones of the impellers by means of separate, individually chargeable and dischargeable work chambers, the hydraulic converter being controllable by means of guide vanes and being proportioned at maximum r.p.m. of the engines and at full opening of the guide vanes to translate the combined power of both engines, the controllable converter being inserted in the path of energy flow on the output side of the hydrodynamic coupling.

The coupling of each engine separately to the power flow via a chargeable and dischargeable hydrodynamic coupling not only damps the torsional vibrations of each individual engine, but also makes it possible to intercouple the engines at any time without the torsional vibrations adding together in an unfavorable coupling position. The construction of the hydraulic converter as a controllable converter connected on the output side makes it possible to adapt the power consumption of the converter for optimal efficiency to the power of one or both engines.

In a preferred embodiment, the dual coupling is provided with a common rotary housing serving as an output wheel and having a gear for engaging the input gear of the speed-changing and reversing transmission. A particularly simple charging and discharging device, which makes possible continuous liquid flow for cooling as well as control of the degree of charging, it obtained by providing the work chambers of the dual coupling, in a manner known per se, with individual drain outlets, the coupling being surrounded by a stationary housing for collecting oil drainage and a controllable inlet being provided for each work chamber. In a further embodiment, which is favorable in view of space as well as weight considerations, at least one of the impellers has a large moment of inertia and serves as a flywheel of the corresponding engine. A bypass coupling may be provided for the controllable torque converter and the controllable guide vanes thereof may provide complete closure. This makes it possible, when the bypass coupling is operative, to make the synchronously running impeller and turbine wheels serve as a brake rotor and the stationary guide vanes as a brake stator and to inhibit the braking action by closing the controllable guide vanes, so that no liquid circulation takes place.

In order to provide for this process to take place automatically, the controllable bypass coupling may be coupled to the control of the guide vanes to cause them to close before actuation of the bypass coupling takes place. A further development of this concept consists in the use of a hydraulic control of the bypass coupling as well as of the guide vanes, by means of pressure-responsive spring-biased pistons, both pistons being subjected to the control pressure, and the return spring of the pressure piston controlling the bypass coupling being hard enough to make the piston respond only above the pressure corresponding to complete closure of the guide vanes.

The invention will be described in more detail below with reference to the drawing.

THE DRAWING

FIG. 1 shows schematically a dual engine driving system of a track-laying vehicle according to the invention.

FIG. 2 shows the hydrodynamic chargeable and dischargeable dual coupling between the coaxially disposed engines, and FIG. 3 shows the controllable and bypassable torque converter of the speed-changing and reversing transmission of the vehicle.

DESCRIPTION OF EMBODIMENT

In the vehicle of FIG. 1, a pair of equal internal combustion engine 1 and 1' are disposed in coaxial arrangement perpendicularly to the path of the vehicle. At the opposed ends of the engines, shafts 3 and 3' extend having the same direction of rotation. Provided at the ends of the shafts is a hydrodynamic dual coupling 2 with two separate work chambers 4 and 4' respectively. The work chambers are formed of buckets 5, 5' of impeller or primary wheels 6, 6' coupled to the engine 1 or 1', respectively, and on the other hand of buckets 7 or 7' of a dual-turbine wheel 8, which also serves as the housing of the coupling and comprises a separating wall 9 between the two work chambers. Each coupling can be charged and discharged separately, the working fluid being applied from the space within a corresponding annular flange 10 or 10' connected via a plurality of borings 11 or 11' with the work chamber. The annular space is on the engine side of the coupling in the hub area thereof. A nozzle 12 or 12' is provided in the rotating housing or wheel 8 at the periphery of the work chamber to continuously inject oil into a housing 13 surrounding the coupling, the oil gathering at the bottom thereof. Individual control of the charging of each coupling is possible with the aid of pumps 14, 14' and valves 15, 15' cooperating with corresponding bypasses. Actuation of valve 15 or 15' controls the portion of the fluid discharged from the corresponding pump that flows into the corresponding work chamber and therewith the degree to which the coupling is filled. The primary wheels 6 and 6' of the dual coupling are very heavy and solid having a large moment of inertia and serve as flywheels for the engines. This reduces the space required for the engine installation by the amount normally corresponding to the flywheels of the engines.

Power is taken off from coupling 2 via housing 8, which is provided with a pair of gears 16 and 17, gear 16 driving the steering mechanism 18 of the track-laying vehicle, whereas gear 17 drives the torque converter 21 and the speed-changing and reversing transmission 19 of the vehicle.

Steering mechanism 18 drives a so-called zero shaft 20 coupled to the output side of the transmission, whereby shaft 20 is rotated in one or the other direction in response to a turning of the steering wheel, (not shown), the amount of rotation of shaft 20 being proportional to the angle of turning of the steering wheel. The speed-changing and reversing transmission is coupled on its output side with the drive shaft 25, which is coupled via superimposing gear drives 26 or 27 to the track drive wheels 28. Zero shaft 20 is coupled to an input gear of each superimposing gear drive with the same gear ratio but in opposite directions, whereby rotation of shaft 20 superposes the speed thereof on one drive wheel positively and on the other negatively, whereby the speed and sense of rotation of zero shaft 20 causes the vehicle to perform a right-hand or a left-hand turn.

Speed-changing and reversing transmission 19 comprises a torque converter 21 of a construction similar to the type of converter conventionally used in automobiles. The converter has impeller channels which are symmetrical relative to a central plane perpendicular to the axis thereof and comprises pump wheel 22, turbine member 23 and guide wheel 24. The blades of guide wheel 24 are controllable and the housing of the converter is rotatable in unison with the primary wheel and coupled with the shaft 29, which is driven by dual coupling 2. The vanes of guide wheel 24 can be adjusted angularly about pivots 31 via crank arms 32 by means of a piston 34. Piston 34 is displaceable in the axial direction and engages corresponding crank arms operating all of the vanes and is subjected to pressure from a conduit 33. A spring 35 acts to return the piston. For each pressure in conduit 33 there is therefore a corresponding position of the guide vanes. The control mechanism is constructed for the purpose of the invention so as to cause the vanes to be moved by spring 35 into the open position when no pressure acts on piston 34, and to permit rotation of the vanes into a position of complete closure.

Provided on the input side of the converter is a frictional, hydraulically operated bypass coupling 36, by means of which drive shaft 29 can be coupled directly to an intermediate shaft 37, the hydrodynamic power flow being then bypassed. Intermediate shaft 37 is the output shaft of converter 21 and at the same time the input shaft of the mechanical speed-changing and reversing transmission 19 coupled to the output side thereof but not shown in FIG. 3. Concentrically disposed about turbine shaft 29 and intermediate shaft 37 is a hollow supporting shaft 38 for the guide wheel.

Bypass coupling 36 is also hydraulically actuated. A pressure piston 40 responsive to pressure from a conduit 39 is held in inoperative position by a plurality of return springs 41 distributed around the circumference thereof. Actuating conduit 33 for controlling the guide vanes and conduits 39 for bypass coupling 36 are connected to one and the same conduit 42, i.e., the pressure chambers of pistons 34 and 40 are connected in parallel. The combined stiffness of springs 41 is proportioned so as to cause pressure piston 40 to start moving only when a sufficiently high pressure is present in conduits 33, 39, and 42 for guide vane 24 to be completely closed against the pressure of spring 35. In this simple manner, there is obtained a guarantee that closure of bypass coupling 36 will be accompanied by closure of guide wheel 24.

The arrangement of the invention requires a considerable number of hydrodynamic power translating elements, which is, however, necessary to achieve the desired results. Track-laying vehicles have to be driven with a converter to make them operable in difficult terrain, however, the converter must be bypassable in view of the importance of a large operating range and of low fuel consumption (lower losses). In dual engine driving systems, however, it is not practical to provide a bypassable converter on the output side of each engine and let the engines drive a common shaft, since it is then possible for them to be coupled with any angular relationship to each other and for the torsional vibrations to add in an intolerable manner. The invention provides the solution to this problem. However, since there is no definite answer to the question as to what power the converter should be dimensioned for, whether for that of one or for that of both engines, according to the invention, the converter is dimensioned for the total power and constructed as a controllable converter so as to be adaptable to either alternative. The highly supercharged combustion engines that are especially used for this type of vehicle are susceptible to lugging down of engine output and would be damaged if a single engine had to cooperate with a converter having at the operating r.p.m. the double amount of power consumption. At the least, the air supply is impaired and with it the engine controllability.

A particular advantage of the invention is that the installed power can be utilized optimally with regard to fuel consumption as well as to behavior of the engines in operation. Owing to the controllability of the converter, it is always possible to operate at the point of maximum efficiency. With bypassable converters, the losses can be brought to a minimum. The engines can be safely connected singly or in unison to the power flow without any danger or superposed oscillations. On the contrary, oscillations are damped in an excellent manner and are kept completely away from the mechanical transmissions.

The blades of any one of the wheels of the converter, i.e., either of the pump wheel or of the guide wheel or of the turbine wheel, may be controllable and any of these alternatives are intended to be covered by the term "controllable blades" used in the claims.

That which is claimed is:

1. In a vehicle having a pair of coaxially disposed internal combustion engines and a speed-changing and reversing transmission for driving the drive wheels thereof and having an operating condition, in which one of said engines is operatively connected to said transmission, and another operating condition, in which both of said engines are thus connected:

a hydraulic converter coupled between said engines and said drive wheels, a hydrodynamic dual coupling comprising a pair of impellers, each of said impellers being coupled to the shaft of a corresponding one of said engines, and a common secondary wheel composed of a pair of turbine wheels, each of said turbine wheels cooperating with a corresponding one of said impellers, said coupling having a pair of separately chargeable and dischargeable work chambers, said hydraulic converter being controllable by means of controllable blades and being proportioned at full opening of said controllable blades to translate the combined power of both said engines at the speed of maximum power thereof, and said hydraulic converter being inserted in the path of energy flow on the output side of said hydrodynamic coupling.

2. A vehicle as claimed in claim 1, in which said hydraulic converter comprises a controllable bypass coupling, said controllable blades being controllable into a position of complete closure thereof.

3. A vehicle as claimed in claim 1, in which at least one of said impellers serves as the flywheel of the corresponding engine.

4. A vehicle as claimed in claim 2, in which said controllable bypass coupling is coupled to the control of said controllable blades for closing said controllable blades before actuation of said bypass coupling.

5. A vehicle as claimed in claim 4, comprising a first pressure-responsive piston for actuating said bypass coupling against the force of a return spring and a second pressure-responsive piston for actuating said controllable blades against a resilient force, said pistons being responsive to a control pressure and the stiffness of said return spring being such as to cause said first piston to be inoperative until complete closure of said blades has occurred.

6. A method of operating a vehicle as claimed in claim 2, in which, when operating on a single engine, said controllable blades are partially closed and, when operating on both engines, said controllable blades are in the position corresponding to maximum efficiency of operation.

7. A method for operating a vehicle as claimed in claim 2, in which said controllable guide blades are completely closed before actuation of said bypass coupling.

* * * * *